FIG. 2a.

April 21, 1959   O. A. KERSHNER ET AL   2,883,019
CLUTCH AND BRAKE COMBINATION AND HYDRAULIC
OPERATING MEANS THEREFOR
Filed July 26, 1954   5 Sheets-Sheet 4

INVENTORS.
O. A. Kershner
G. D. Ishoy
BY Robert Cobb
Attorneys.

といstates Patent Office 2,883,019
Patented Apr. 21, 1959

2,883,019

CLUTCH AND BRAKE COMBINATION AND HYDRAULIC OPERATING MEANS THEREFOR

Osborn A. Kershner, St. Joseph, and Albert D. Ishoy, Hartford, Mich., assignors, by mesne assignments, to Lambert Brake Corporation, St. Joseph, Mich., a corporation of Michigan Application July 26, 1954, Serial No. 445,608

13 Claims. (Cl. 192—13)

The present invention relates to a novel and improved clutch and brake combination and hydraulic operating means therefor, and more particularly, to an improved clutch and brake combination which is particularly adapted for use in the power transmission systems of heavy motor equipment such as various types of tracked vehicles and wheeled vehicles, wherein steering of the vehicles is ordinarily accomplished in whole or in part by means of clutch and brake assemblies which are operatively interposed in the power transmission systems of the vehicles to selectively effect or interrupt the drive to the drive sprockets for the tracks, or to the traction wheels of the vehicles, or to selectively brake rotation of such drive sprockets or traction wheels.

Generally speaking, it is an object of the invention to provide a combined friction clutch and friction brake assembly which comprises brake and clutch elements which are interchangeable for purposes of facilitating manufacture, assembly, repair, replacement, and storage of the various components of the assembly.

A further object is to provide such a combined clutch and brake assembly which includes interleaved clutch and brake discs, and which is so constructed and arranged that both the clutch and the brake discs are shiftable into engagement with a common relatively fixed pressure plate, thus reducing the number of parts required and simplifying the construction.

Another object is to provide a combined clutch and brake assembly which includes a fluid pressure-operated actuator assembly for effecting engagement of the clutch and another such assembly for effecting engagement of the brake, these hydraulic actuator assemblies each including a power cylinder having a piston shiftably mounted therein, self-energizing camming means in the cylinders for energizing the pistons to shift the same outwardly of the cylinders responsive to load on the clutch or on the brake tending to shift the pistons rotatively relative to the cylinders, and each cylinder constituting a power member against which the aforesaid camming means react to energize the clutch or the brake with a powerful servo-action proportional to the load on the clutch or on the brake, as the case may be, whereby the clutch and brake assembly may be of relatively small size for the high torque loads which can be transmitted or absorbed thereby.

Still another object is to provide a combined clutch and brake assembly which is adapted to be embodied in the power transmission system of heavy automotive equipment such as bulldozers and other tracked vehicles, and farm tractors and other wheeled vehicles, and which is sealed against the entry of dust, water, and the like, while operating in an oil bath so as to be continuously cooled and lubricated.

In attaining the last-mentioned objective, the clutch and brake assembly is preferably so constructed and adapted for installation in a vehicle power transmission system that the regular lubricating oil for the vehicle transmission system may be employed as the cooling and lubricating oil for the clutch and brake assembly. Accordingly, a further object is to provide means for maintaining an ample supply of oil in the clutch and brake assembly, as by the provision of a baffle or dam which maintains in the casing or housing for the assembly a reservoir or bath of oil through which the rotating parts of the assembly pass to pick up oil and spray or splash the oil over the non-rotating parts.

Still another object is to provide a clutch and brake assembly as aforementioned having an operating system which can be adapted to pick up oil from the power transmission housing of the vehicle and to supply this oil under pressure to the respective hydraulic actuators for the clutch and the brake, said system including control valves for selectively supplying oil under pressure to the clutch, to the brake, or to the clutch and brake, selectively.

An additional object is to provide a combined clutch and brake assembly having a hydraulic actuator system as aforesaid, wherein the actuators for the clutch and for the brake are continuously bled, thus avoiding the entrapment of air in the actuator system and providing for a substantially constant flow of oil into the aforesaid reservoir to replace oil splashed or otherwise displaced over the dam or baffle. This objective is preferably attained by the provision of an appropriate bleed opening or openings through the actuators, or by so proportioning the cylinders, the pistons, and the sealing means for the actuators that seepage of the hydraulic fluid or transmission oil out of the actuator cylinders is constantly permitted while the clutch and brake are engaged.

And still another object of the invention is to provide a clutch and brake combination of the aforementioned type, wherein the actuator for the clutch and for the brake includes a member which is rotatable and a member which is fixed, the hydraulic actuator fluid or transmission oil passing through the fixed member and through the rotatable member into the actuator cylinder, and seals in the form of resilient, expansion or slip rings are employed between the rotatable member and the fixed member to prevent the loss of actuator fluid or transmission oil.

Specifically, the invention contemplates the provision of an improved hydraulically actuated clutch and brake combination which is adapted to be interposed in the chain of power from a vehicle engine to the traction means, either of the track or wheel type, of the vehicle, one such combination to be employed for the traction means at one side of the vehicle and another such combination to be employed for the traction means at the opposite side of the vehicle. The clutch and the brake are normally disengaged, and a hydraulic pump, such as the pump utilized to operate the implement lift of most farm tractors, or the pump utilized to operate a lift for a dozer blade, is utilized to supply oil from the vehicle transmission housing to the respective clutch actuators individually and/or together, under the control of a selector valve, this pump also being utilized to supply oil from the vehicle transmission housing to the respective brake actuators individually and/or together under the control of a selector valve and a pressure control valve, said pressure control valve being adapted to be operated by the vehicle operator to govern the braking action according to braking requirements. When a vehicle is so equipped, it may be readily steered by the utilization of the respective clutches and brakes at the opposite sides of the vehicle by selectively interrupting the transmission of power to the traction means at one side of the vehicle, at the other side thereof, or both, or by selectively applying the brake at one side of the vehicle, the other side of the vehicle, or both, or any combination thereof, as may be required or desired to execute slight deviations in the direction of travel of the vehicle, as well as relatively sharp turns.

Other objects and advantages of the invention will be hereinafter described or will become apparent to those skilled in the art, and the novel features thereof will be defined in the appended claims.

In the accompanying drawings:

Fig. 3 is a view in vertical section, as taken on the line 3—3 of Fig. 2a;

Like reference characters in the several figures of the drawing and in the ensuing description designate corresponding parts.

The clutch and brake combination of the invention is adapted to be encased within a housing of any suitable formation, and for illustrative purposes, a housing 1 of cylindrical form, having an end wall 2 at its outer extremity and having a radially extended flange 3 at its inner extremity, is shown. The housing 1 would normally be secured to the outside surface of a side wall 4 of the conventional power transmission system housing of a motor vehicle, such as a tracked vehicle or a wheeled vehicle, the transmission housing 4 being provided with an opening 5 therethrough, whereby elements of the clutch and brake combination can project into the conventional power transmission housing for connection with the power transmission system of the vehicle.

Figures 5, 6:
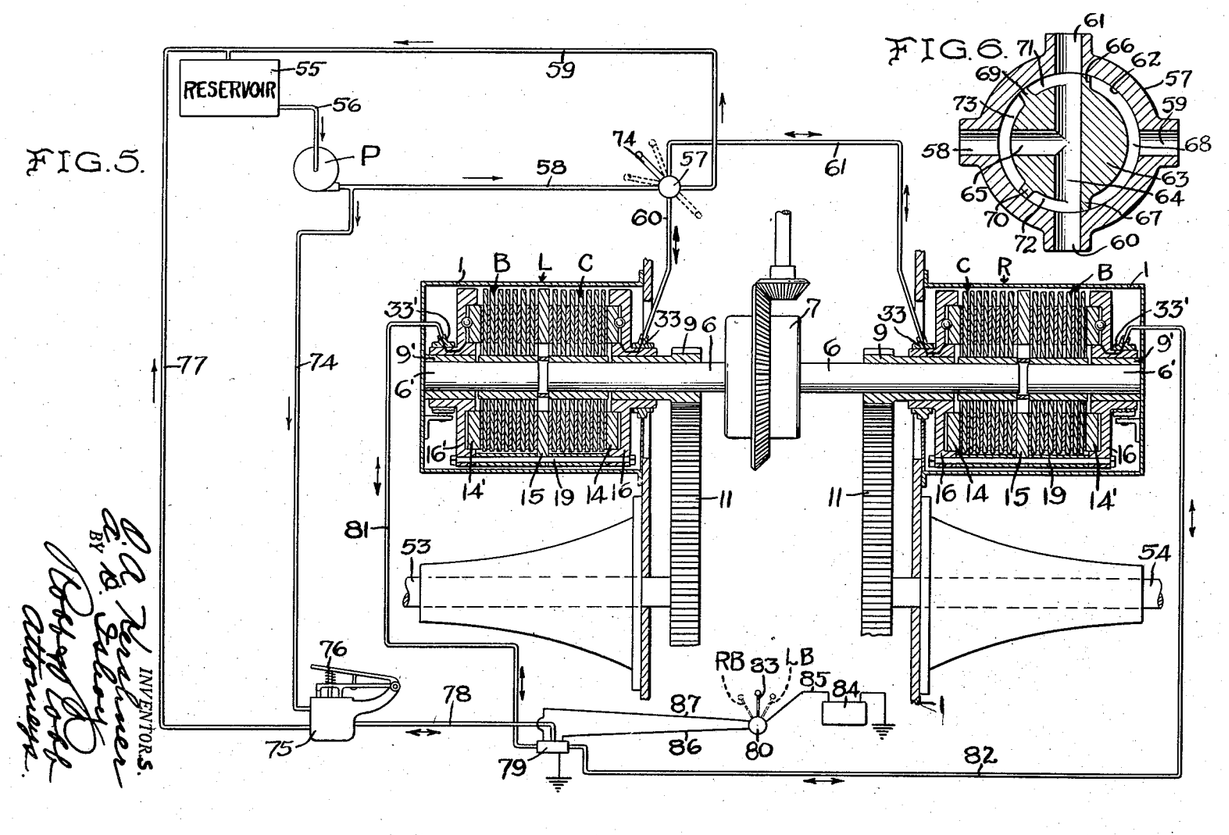
Fig. 5 is a diagrammatic view, showing in section a pair of clutch and brake assembly units associated with the final drive to the traction means at opposite sides of a motor vehicle, and also showing schematically a hydraulic operating system for controlling the operation of the respective clutch and brake units.
Fig. 6 is a view in section of an illustrative selector valve which is typical of valves that may be employed in the operating system of Fig. 5.

Projecting axially into the housing 1 through the opening 5 in the transimssion housing 4 is a rotary power input shaft or member 6 which, as viewed in Fig. 5, is adapted to be driven by the differential gearing 7 of an automotive vehicle. It should be understood, however, that the power input shaft 6 may also be driven by any other suitable means, depending upon the installation of the clutch and brake combination, and the showing thereof in association with the differential and final drive gearing of a motor vehicle is only illustrative of one advantageous application. Coaxially disposed about the power input shaft 6 and rotatably supported thereon, as by means of a plurality of sleeve bearings 8, is a power output member 9 in the form of a short hollow shaft having gear teeth 10 formed on one of its ends for driving engagement with complemental gear teeth on a bull gear 11 or the like. It should also be understood that the gear formation on the hollow shaft 9 is not material to the invention and that any other suitable drive mechanism may be utilized to transmit power from the power output member 9 to a member to be driven thereby, such as any conventional gearing system, chain drive, or the like.

A torque transmitting device in the form of friction clutch means generally designated C is employed to transmit torque from the power input shaft or member 6 to the power output member or hollow shaft 9. The clutch C comprises a plurality of interleaved friction discs 12 and 13, a primary actuator member 14, a secondary actuator member 15, and a power member 16. The friction discs 12 are connected to the power input shaft 6 for rotation therewith, while being free for axial shifting movements, by means of a splined connection, as at 17, with the outer periphery of an axially extended, complementally splined sleeve or insert 18 which is in turn splined about its inner periphery for connection to the power input shaft 6.

Figure 2:
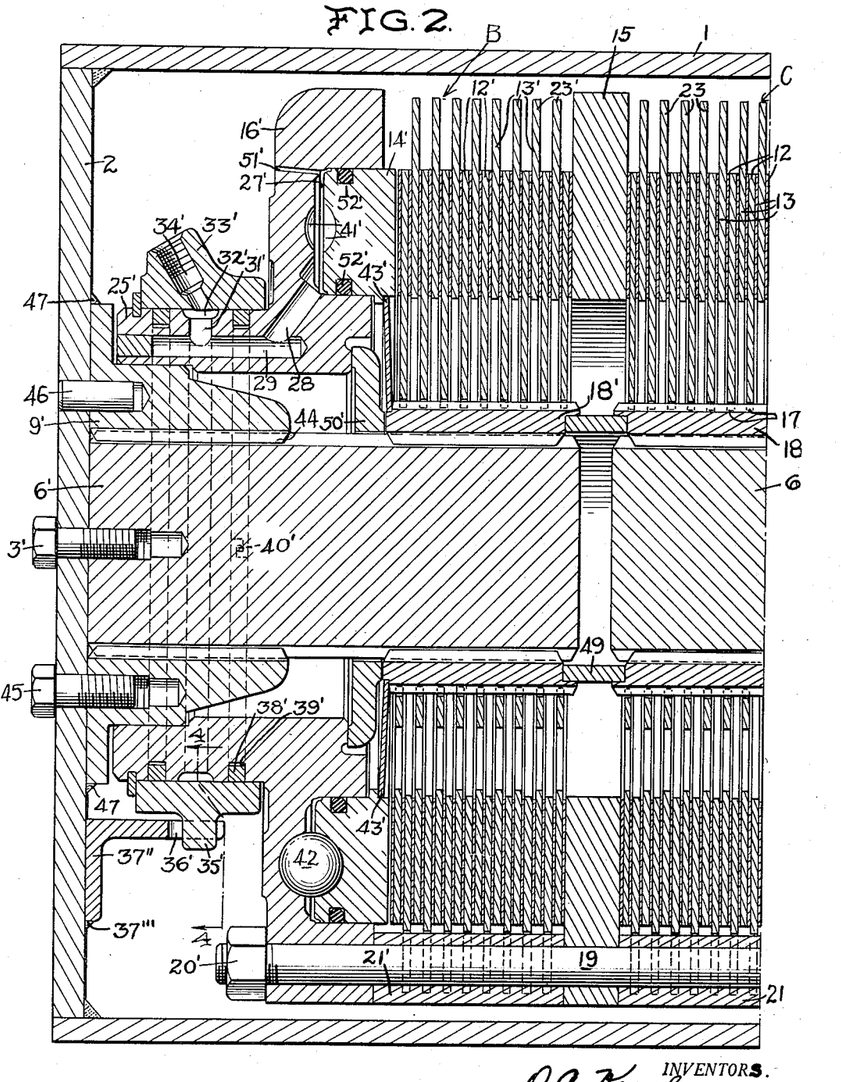
Fig. 2 is a partial view of the clutch and brake assembly in longitudinal section, as taken on the line 2—2 of Fig. 1.
Figure 2A:
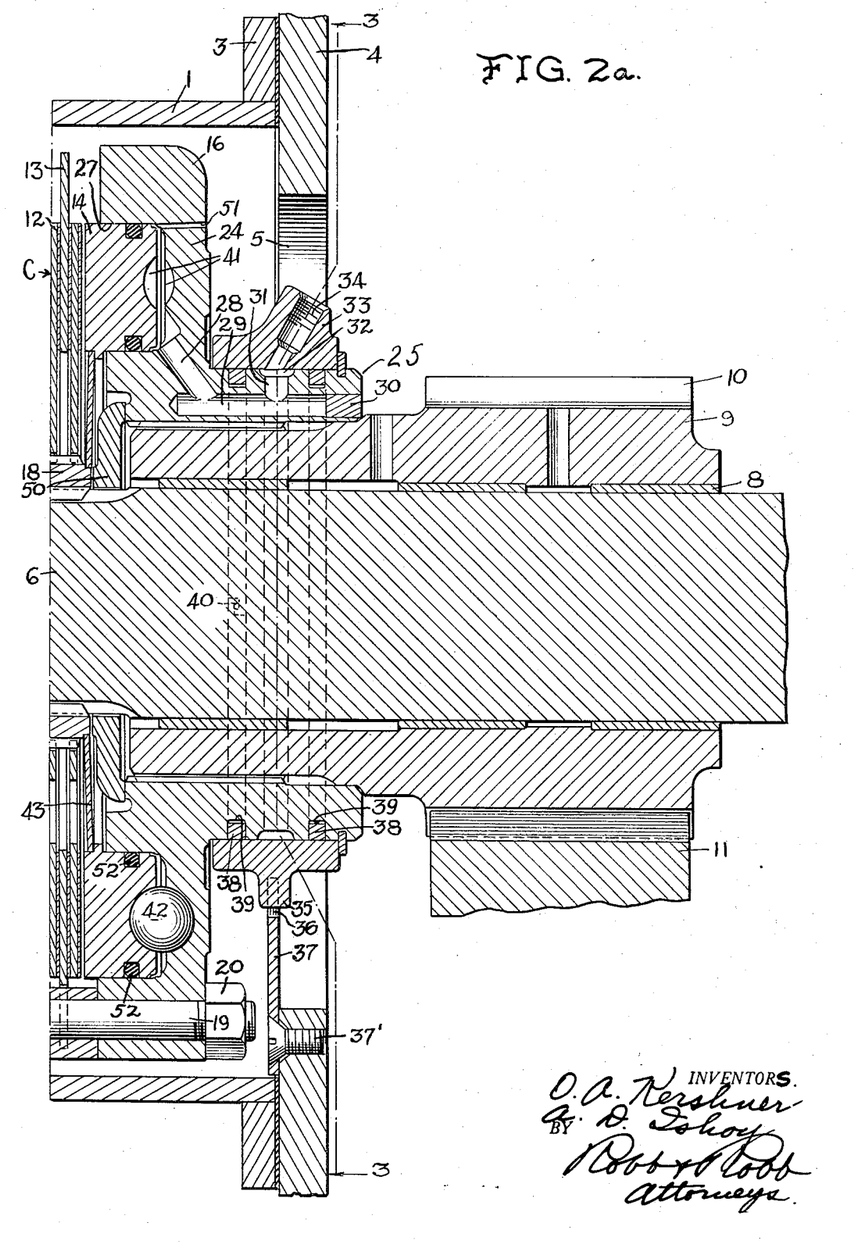
Fig. 2a is a continuation of the longitudinal section of Fig. 2.

The friction discs 13 which are alternately arranged with the friction discs 12 are suitably connected to the power member 16 for rotation therewith, while being free for axial shifting movement. For this purpose, a plurality of longitudinally extended tie bolts or connectors 19 extend through the power member 16 adjacent its outer periphery and in equidistantly spaced positions circumferentially about the clutch assembly, these tie bolts 19 being connected to the power member 16 by means of a plurality of nuts 20, as best seen in Fig. 2a, and the tie bolts 19 extend through the secondary actuator member 15 as is best seen in Fig. 2. Mounted upon adjacent pairs of tie bolts 19 and disposed between the secondary actuator member 15 and the power member 16 is a suitable number of spacers 21 of generally U-shaped cross section which define circumferentially spaced sockets 22 into which radially projecting lugs 23 formed in circumferentially spaced relation about the outer periphery of the friction discs 13 project, so as to key the discs 13 to the power member 16 for rotation therewith.

Figure 3:
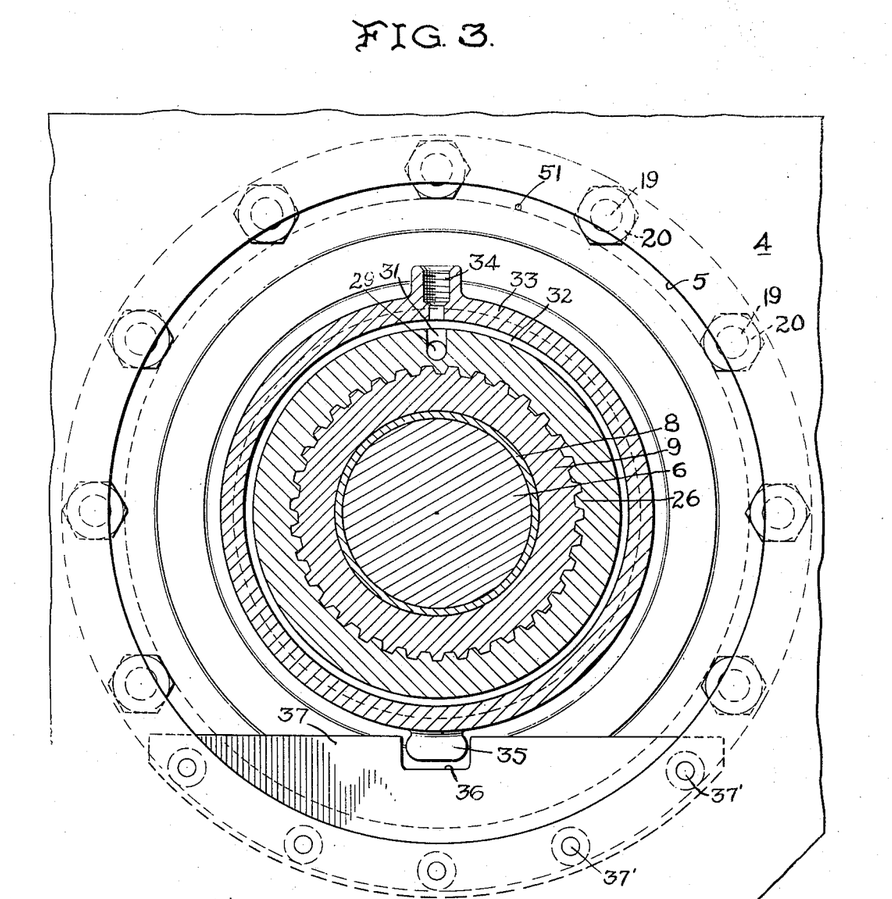

Accordingly, when the friction discs 12 and 13 are pressed between members 14 and 15 into engagement with one another, torque will be transmitted from the power input shaft 6 to the power member 16, and the member 16 will transmit such torque to the output member or shaft 9. The power member 16 includes an annular body 24 having an axially extended central hub 25, the hub 25 having its inner periphery splined for engagement with complemental splines formed in the end of the power output shaft 9, as at 26, as is best seen in Fig. 3.

In order to shift the friction discs 12 and 13 into engagement, means are provided for shifting the primary actuator member 14 towards the secondary actuator member 15, and as viewed in Fig. 2a, the primary actuator member 14 is in the form of an annular piston which is reciprocably mounted in an annular piston chamber 27 formed in the left-hand side of the power member 16, whereby fluid under pressure, when admitted into the piston chamber 27, will force the annular piston 14 to the left, as viewed in the Fig. 2a, so as to press the friction discs 12 and 13 together and up against the secondary actuator plate or member 15.

In order to admit operating fluid into the piston chamber 27, the portion 24 of the power member 16 is formed with an angularly disposed fluid passage 28 which communicates with an axially extended passage 29 formed in the hub 25 of the power member 16, this passage 29 being suitably closed at its outer end, as by means of any suitable plug 30. Extending radially inward from the outer periphery of the hub 25 into communication with the passage 29 is an inlet opening 31 which is adapted to receive fluid from a suitable source. In view of the fact that the power member 16 rotates when torque is being transmitted through the clutch C, it is necessary to adapt the rotary hub 25 so that it can receive operating fluid from a fixed source. Therefore, the outer periphery of the hub 25 is formed with an annular groove or passage 32 which communicates with the inlet opening 31. Mounted upon the hub 25 is an adapter ring 33 having an inlet opening 34 which is in communication with the annular passage 32 in the hub 25, and which is adapted to receive a fluid conduit, as will be hereinafter more fully described.

In order to fix the adapter ring 33 against rotation, the ring 33 is preferably provided at its bottom side with a radial projection or lug 35 which is adapted to project into a notch 36 formed in the upper edge of a baffle or dam 37 which has a purpose to be hereinafter more fully described.

Means are provided for preventing the flow of actuator fluid between the opposed surfaces of the adapter ring 33 and the hub 25. Preferably, these sealing means comprise a pair of annular expansion slip rings 38, 38, these rings being of a type commonly used in internal combustion engines as piston rings and being expandable so as to closely fit and conform to the inner periphery of the adapter ring 33, while snugly fitting within an annular groove 39 formed in the outer periphery of the hub 25 for the reception of each of the rings 38. For the purpose of allowing expansion of the rings 38, they are preferably split and formed with notched, interengaged ends, as at 40, as is common practice in the art of piston rings.

Figure 1:
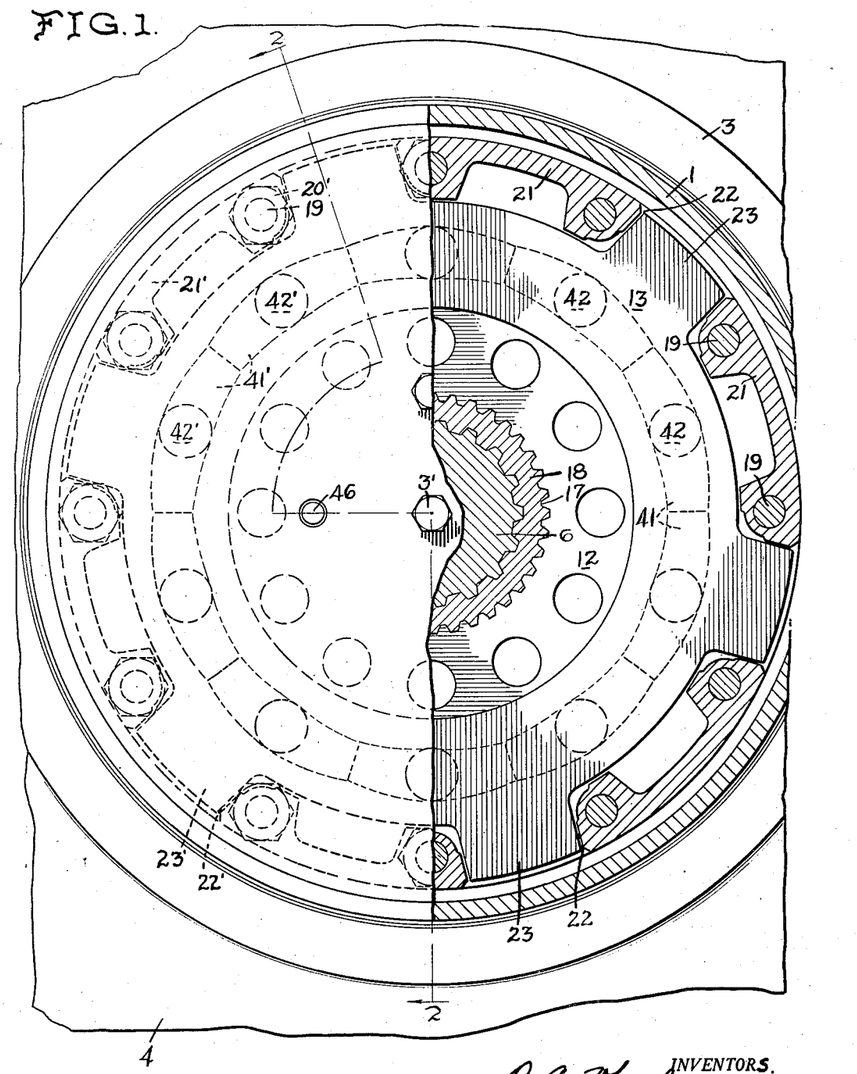
Fig. 1 is a view partly in end elevation and partly in transverse section, showing the combined clutch and brake assembly of the invention, the portion of this view in transverse section being a typical section between the clutch friction discs.

In order to effect a powerful self-energization or servo-action of the clutch C, the inner opposed walls of the annular piston 14 and the piston chamber 27 are provided with a plurality of pairs of opposed, ramped seats 41, 41 disposed in circumferentially spaced relation about the axis of the clutch, and mounted in each pair of opposed seats 41, 41 is a hardened camming ball or energizing member 42. In the illustrated clutch there are 10 pairs of ramped seats 41, 41, as is clearly seen in Fig. 1. Accordingly, since the friction disc 12 which is next to the piston or primary actuator member 14 is connected to the power input shaft 6 for rotation therewith, and the power member 16 is connected with the power output shaft 9, any tendency of the power output shaft 9 to lag behind the power input shaft 6 will cause a slight relative rotative movement of the piston 14 in piston chamber 27, with an attendant camming action of the balls which forces the friction discs 12 and 13 into harder frictional engagement to the extent that slippage of the clutch is virtually prohibited.

Acting in opposition to the actuating pressure of the actuator piston 14 and to the camming action of the balls 42 is an annular, generally frusto-conical clutch release spring 43 having its outer margin bearing against the annular piston 14 and acting to urge the piston inwardly of the piston chamber 27, the inner margin of the spring 43 bearing against the end of the splined sleeve 18. Accordingly, when fluid pressure in the annular piston chamber 27 is relieved, the spring 43 will effect disengagement of the clutch C.

According to one of the primary objectives of the invention, there is provided a second torque transmitting or absorbing device in the form of a brake B which includes a primary actuator member or annular piston 14', a power member 16', friction discs 12' and 13', and an adapter 33', all of which are substantially identical in structure and function with corresponding elements designated by unprimed reference characters previously described, and most of which are inter-changeable. The secondary actuator plate 15 of the clutch also serves as a secondary actuator plate for the brake B, and as is best seen in Fig. 2, the secondary plate or member 15 is maintained against axial movement by means of a plurality of spacers 21' which are interposed between the member 15 and the power member 16' and on the tie bolts 19, and a plurality of nuts 20' in conjunction with nuts 20 previously described serve to clamp the spacers 21 and 21' and the secondary actuator member 15 together between the power members 16 of the clutch and 16' of the brake, so that these elements are maintained against relative axial movements.

The brake discs 12' are splined on the outer periphery of a sleeve 18', this sleeve being splined on the inner end of a short shaft section 6' which is centrally disposed and axially extended in the housing 1, and secured to the end wall 2 of the housing 1 by means of a screw 3' or the like. Surrounding the outer end of the shaft section 6' and splined thereto as at 44 is a hub member 9' which is secured to the end wall 2 of the housing 1 by means of a suitable number of screws 45, a pin 46 and any other suitable means, such as by welding, as at 47. Thus, the shaft section 6' is rigidly mounted on the end wall 2 of the housing 1 and held against rotation, the discs 12' accordingly also being fixed against rotary movements, but being free for axial shifting movements.

The brake discs 13' are provided with radially extended lugs or ears 23' which project into the spaces between the spacers 21' to key the brake discs 13' to the brake power member 16'. The brake members 16' and 14' constitute a hydraulically operated actuator device, since in the brake herein disclosed, the member 14' constitutes an annular piston which is shiftably mounted in an annular piston chamber 27' in brake member 16', and fluid passages 28', 29', 31', 32' and 34' establish communication with the piston chamber 27' from a source of fluid pressure which is adapted to be supplied to the inlet opening 34' in the adapter 33'. Slip rings 38' seated in annular grooves 39' seal the actuator device against loss of fluid pressure between the adapter 33' and the hub 25' of the power member 16'.

Figure 4:
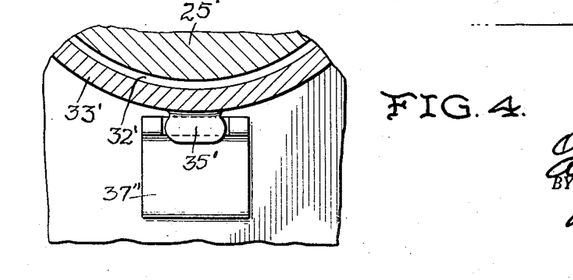
Fig. 4 is a fragmentary view in section, as taken on the line 4—4 of Fig. 2.

Since the brake power member 16' is a rotary element, and the source of fluid pressure for actuating the brake would normally be stationary, means are provided for preventing rotation of the adapter 33' with the power member 16'. This means is particularly shown in Fig. 4, wherein the adapter 33' is shown as being provided with a radially projecting lug or ear 35' disposed at the bottom thereof and extending into a notch 36' formed in an L-shaped bracket 37". The bracket 37" is suitably secured to the end wall 2 of the casing 1 by suitable means, such as welding at 37''' in Fig. 2.

The brake B, as is the clutch C, is provided with self-energizing means in the form of oppositely inclined pairs of ramped seats 41', 41', each pair of seats 41' having a hardened ball 42' therein.

Since the structure just described is to be utilized as a brake, as distinguished from a clutch, the brake member 9' and the hub 25' of the power member 16' are not splined together as is the case with clutch members 25 and 9. Instead, the power member 16' is adapted to rotate with the clutch power member 16 when the power output shaft 9 is rotating. Therefore, since the brake discs 12' are fixed against rotation, engagement of the brake discs 12' and 13' will effect a braking action upon the brake power member 16', the common secondary actuator member 15, and the clutch power member 16, which are all connected together by means of the tie bolts 19 so as to rotate together as a unit.

When the brake actuator piston 14' frictionally engages with the adjacent brake disc 12', the tendency of the actuator piston 14' is to remain stationary with the adjacent brake discs 12' upon engagement of the brake, while power member 16' continues to rotate along with the clutch power member 16, thus bringing into play the camming action of the energizing balls 42', to effect a powerful self-energization of the brake B.

A brake release spring 43' which is similar in structure to the clutch release spring 43, is interengaged between the brake member 18' and the brake actuator piston 14', so as to urge the brake actuator 14' inwardly of the piston chamber 27' when fluid pressure in the piston chamber 27' is reduced.

Interposed between the splined sleeve 18 of the clutch C and the splined sleeve 18' of the brake B and seating in opposed recesses in the respective sleeves, is a bearing spacer 49. Interposed between the other end of the clutch sleeve 18 and the power member 16 is an annular spacer 50, and a corresponding annular spacer 50' is interposed between brake sleeve 18' and brake member 16'. The spacers 50 and 50', together with spacer 49, serve to maintain the splined sleeves 18 and 18' in place and to determine the axial spacing of clutch and brake members 16 and 16'.

In use, in order to establish a driving connection between the power input shaft 6 and the power output shaft 9, fluid under pressure is admitted into the piston chamber 27, thereby forcing the annular piston 14 axially to the left, as viewed in Fig. 2a, into engagement with the adjacent disc 12, and the pack of friction discs 12 and 13 are pressed between the piston 14 and the secondary actuator member 15. Thereupon, rotation is imparted to the clutch power member 16, which in turn by virtue of its splined connection with the power output shaft 9, causes rotation of the power output shaft. Also, the tie bolts 19, which are connected with the clutch power member 16 and the secondary actuator member 15 cause corresponding rotation of the brake power member 16' when the brake B is disengaged. If the load on the power output shaft 9 exceeds the unenergized torque capacity of the clutch, self-energization of the clutch will be effected by the camming balls 42, as has been hereinbefore described.

Now, if it should be desired to retard rotation of the power output shaft 9 for any purpose, fluid under pressure is admitted to the brake piston chamber 27', thereby shifting the actuator piston 14' to the right, as viewed in Fig. 2, to press the brake discs 12' and 13' between the piston 14' and the secondary actuator member 15. Since the discs 12' are fixed against rotation, they will create a drag on the rotating brake discs 13' thus effecting a braking action on the tie bolts 19 which act through the clutch power member 16 to retard rotation of the power output member 9.

To release either the clutch C or the brake B, it is merely necessary to relieve the fluid pressure in the respective piston chambers 27 and 27', and the respective release springs 43 and 43' of the clutch and brake will cause them to be disengaged.

As has been hereinbefore mentioned, there is a barrier 37 which partially blocks off the opening 5 through the conventional power transmission 4, this barrier or dam preferably being in the form of a chordal plate which is secured about its arcuate lower edge as by means of a suitable number of screws 37' to the transmission housing wall 4. Accordingly, this dam or barrier 37 partially closes off the casing 1 for the clutch and brake combination and provides an oil reservoir or a bath through which the rotating clutch and brake parts move and pick up a supply of oil which is sprayed or splashed over the non-rotating parts. Therefore, the entire clutch and brake assembly is continuously well lubricated, with attendant reduction in wear and maintenance.

It has also been previously mentioned that the lubricating oil which is normally utilized in the transmission housing of a motor vehicle may be utilized as a source of fluid in the clutch and brake operating system, and that the system may be continuously bled to prevent the entrapment of air in the system, and therefore, the clutch power member 16 is shown as being provided with a small bleed opening 51 extending therethrough and communicating with the annular piston chamber 27 adjacent to the top thereof. The brake piston chamber 27' is also provided with a corresponding bleed opening 51'. Accordingly, a small quantity of the fluid being utilized as the operating fluid will continuously be forced through the small openings 51 and 51', so as to bleed any air in the actuator devices, and at the same time, the fluid which passes through openings 51 and 51' will serve to replenish the supply of oil in the oil bath maintained in the aforementioned reservoir. If preferred, in lieu of providing the small bleed openings 51 and 51', the annular actuator pistons 14 and 14' and the piston chambers 27 and 27' may be so proportioned as to allow a slight seepage of actuator fluid between the contacting surfaces of these parts. In the illustrative embodiment, there is shown a pair of O-ring seals 52, 52 carried by the clutch actuator piston 14 for sealing engagement with the inside walls of the clutch piston chamber 27, and if seepage past the O-ring seals is desired, for the purposes of effecting a continuous bleed of the actuator device, the compression applied on the O-ring seals may be controlled to permit such bleeding by suitably proportioning the diameter of the seals. The same thing is true of a pair of O-ring seals 52', 52' which are shown as being carried by the brake actuator piston 14'.

Referring now to Fig. 5, there is shown schematically a pair of clutch and brake combinations of the type hereinbefore described, these combined clutch and brake assemblies being designated L and R and respectively being mounted upon the left and right side of a conventional power transmission housing 1, and having their respective power input shafts 6, 6 driven by the conventional differential gear assembly 7. The respective power output shafts of the clutch and brake combinations L and R are shown in Fig. 5 as being geared to a large bull gear 11 which in turn respectively drive a lefthand final drive shaft 53 and a righthand final drive shaft 54. These drive shafts 53 and 54 may be utilized to drive any appropriate traction means for a vehicle such as track-driving sprockets or the like, or the shafts 53 and 54 may constitute axles for traction wheels of a vehicle. In any case, the clutch and brake combination L would be utilized to control the transmission of power from the differential 7 to the shaft 53 and to effect braking of the shaft 53, while the clutch and brake combination R would be utilized to effect the transmission of power from the differential 7 to the shaft 54 or to effect braking of the shaft 54.

The system of Fig. 5 includes a reservoir 55, which if it is desired to use the lubricating oil in the vehicle transmission housing as the actuating fluid for the clutch and brake combination, would be constituted by the transmission housing of the vehicle. Connected to the reservoir 55 by a line 56 is a constantly running pump P of the type with which most heavy duty equipment of the type aforementioned is usually provided. Running from the pump P to a clutch control valve 57 is a line 58. Leading from the clutch control valve 57 are three lines, namely, a return line 59 leading from the clutch control valve 57 to the reservoir 55, a line 60 leading from the valve 57 to the adapter 33 of the lefthand clutch and brake assembly, and a line 61 leading from the control valve 57 to the adapter 33 of the righthand clutch and brake assembly.

The clutch control valve 57 is adapted to direct fluid from the pump P to both of the clutch and brake combinations L and R simultaneously, or to either of the clutch and brake combinations selectively. This valve 57 is provided with 4 circumferentially spaced ports which are designated by reference character corresponding to the reference character which is applied to the respective lines 58, 59, 60 and 61. Interiorly of the valve casing, it is provided with a circular chamber 62 in which is rotatably mounted a rotor 63 having a diametrically extended passage or port 64 therethrough, and having a radially extended passage or port 65 disposed at right angles to the transverse port 64 and communicating therewith. The outer periphery of the rotor 63 is provided with a number of circumferentially extended depressions which form fluid passages, while leaving outstanding vanes or barriers which are adapted to sealingly engage the walls of the chamber 62. Two of such vanes designated 66 and 67 are located at the side of port 64 opposite port 65 to provide a long arcuate passage 68 between the vanes 66 and 67. The intersecting ports 64 and 65 form a pair of sectors respectively having vanes 69 and 70 projecting from their arcuate surfaces, the vane 69 forming an end wall of an arcuate passage 71 communicating with one end of the port 64, the vane 70 forming an end wall of an arcuate passage 72 communicating with the other end of the port 64, and the vanes 69 and 70 together forming opposite end walls of an arcuate passage therebetween which is generally designated 73 and which communicates with port 65 in the rotor 63. Exteriorly of the valve 57, it is preferably provided with a suitable operating arm 74, whereby the rotor 63 may be selectively rotated to a desired position, so as to control the passage of fluid from the valve into the various lines connected therewith. When operating arm 74 is in the position shown in full lines in Fig. 5, the valve is in the position shown in Fig. 6, and fluid enters the valve through line 68 and is free to flow through passage or port 65 into port 64 and thence in diametrically opposed directions into both line 60 and 61. Thus, actuating pressure would be applied to the clutch C of both of the clutch and brake combinations L and R, and these respective clutches would be engaged. When both clutches are so engaged, power will be transmitted through the differential unit 7 to both of the bull gears 11, and consequently to both shafts 53 and 54.

Should it be desired to disengage clutch C of clutch and brake combination R, the valve rotor 63 will be rotated by shifting arm 74 in a counter clockwise direction to the broken line position shown in Fig. 5, and ports 59 and 61 will be in communication with each other through passage 68, so that fluid may flow back through line 61 and 59 to the reservoir 55, while communication between supply line 58 and line 60 to clutch C of clutch and brake combination L is maintained through port 65, port 64, passage 72 and port 60.

Should it be desired to disengage clutch C of clutch and brake combination L, while leaving clutch C of clutch and brake combination R in engagement, the rotor 63 will be rotated by shifting arm 74 in a clockwise direction to the position shown in broken lines in Fig. 5, and ports 59 and 60 will be in communication with one another through passage 62, at which time fluid may flow back through lines 60 and 59 to the reservoir 55, while actuating fluid continues to be supplied from supply line 58 through port 65, port 64, passage 71 and port 61.

If both clutches C of clutch and brake combinations L and R are to be disengaged, the rotor 63 will be rotated 180° by shifting the arm 74 to the broken line position shown in Fig. 5, and both lines 60 and 61 will be brought into communication with line 59 through ports 65 and 64, so as to allow the actuating fluid to flow from both clutches back to the reservoir.

The pump P is also utilized to supply actuating fluid to the brake B of the clutch and brake combinations L and R, and for this purpose, a line 74 communicates with supply or pressure line 58 to direct fluid under pressure to a brake pressure control valve 75 of any conventional type, this brake pressure control valve preferably having a foot pedal 76 for controlling the pressure of the fluid to be supplied to the brakes. Running from one side of the valve 75 is a return line 77 leading from the valve to the reservoir 55, and leading from the other side of the valve 75 is a line 78 which carries fluid to a brake selector valve 79, this brake selector valve 79 preferably being of the solenoid-operated type and being under the control of a manually operated selector switch mechanism 80 to direct fluid from supply line 78 to a line 81 leading from valve 79 to adapter 33' on the brake B of the clutch and brake combination L, or to the line 82 which leads from valve 79 to adapter 33' of brake B of clutch and brake combination R, or to both of the lines 81 and 82 at the same time.

The selector switch mechanism 80 is preferably manually controlled by means of an arm 83, and is operative to close a circuit from a source of electric current 84 through lead 85 to the control switch, and then selectively through leads 86 and 87 to shift the solenoid operated valve in opposite directions, as is diagrammatically illustrated in Fig. 5.

The brake operating system would normally be in such a condition that application of pressure to pedal 76 would allow fluid under pressure to flow from line 74 to both lines 81 and 82 so as to apply both brakes B of clutch and brake combinations L and R, and when pressure is released from pedal 76, fluid would flow from line 78 through valve 75 and back through return line 77 to the reservoir 55. However, should it be desired to engage, for instance, the brake B of clutch and brake combination L, the operator member 83 of control switch mechanism 80 would be shifted to, for instance, dotted line position LB whereupon pressure applied to the pedal 76 would allow pressure fluid to flow through line 78 to the valve 79 which would allow fluid under pressure to enter only line 81. On the other hand, if it should be desired to engage only brake B of clutch and brake combination R, then the control arm 83 would be shifted to the dotted line position designated RB, and pressure fluid then could flow only from valve 79 through line 82.

It is believed unnecessary to illustrate or describe in detail the specific structure of the valves 75 and 79 or the control switch mechanism 83, since any suitable valve structures and switch mechanism may be utilized which are capable of effecting the desired results.

It should be noted that either clutch or either brake may be applied or released selectively without regard to the condition of its associated brake or clutch or without regard to the condition of the clutch or brake at the other side of the vehicle and therefore, a complete power and steering control for the vehicle is afforded, whereby various degrees of braking pressure may be applied to the traction means at one side of the vehicle or the other, depending upon the nature of the turn to be executed; both brakes may be applied if it is desired to retard movement of the vehicle; one clutch or the other may be disengaged to interrupt the drive to one side of the vehicle so as to allow the vehicle to pivot upon the undriven traction device in the execution of a sharp turn; and other combinations of applied and/or released clutches and brakes may be resorted to in utilizing the system disclosed in Fig. 5.

While the specific details of an illustrative embodiment of the invention have been herein shown and described, changes and alterations may be resorted to without departing from the spirit thereof as defined in the appended claims.

We claim:

1. Power transmission mechanism of the class described, comprising an oil containing housing, power transmission means in said housing including a drive member and a driven member, clutch means for establishing and interrupting the transmission of power from said drive member to said driven member, brake means for retarding rotation of said driven member, hydraulic actuator means for effecting engagement of said clutch and brake means, respectively, a hydraulic pump constantly driven by said power transmission means, means for feeding oil from said oil containing housing to said pump, means for feeding oil under pressure from said pump to said clutch and brake actuator means, and means for selectively controlling the flow of oil from said pump to said clutch and brake actuator means.

2. Power transmission mechanism as defined in claim 1, wherein the means for controlling the flow of oil from said pump to said clutch actuator means includes a selector valve, return means for feeding oil from said selector valve to said oil containing housing, said selector valve having means for selectively directing oil to said clutch actuator means, to said return means, and from said clutch actuator means to said return means, and means for operating said selector valve.

3. Power transmission mechanism as defined in claim 1, wherein the means for controlling the flow of oil from said pump to said brake includes a control valve, return means for selectively feeding oil from said control valve to said oil containing housing, said control valve having means for directing oil to said brake actuator means, to said return means, and from said brake actuator means to said return means, and means for operating said control valve.

4. Power transmission mechanism as defined in claim 1, wherein said clutch and brake means are disposed in a hollow oil containing casing communicating with said oil containing housing, said casing having an oil reservoir in which said clutch and brake operate.

5. Power transmission mechanism as defined in claim 1, wherein said clutch and brake means are disposed in a hollow oil containing casing communicating with said oil containing housing, said casing having an oil reservoir in which said clutch and brake operate, said clutch and brake actuator means each being provided with means to permit continuous bleeding of oil from the actuators into said reservoir.

6. Power transmission mechanism of the class described, comprising an oil containing housing, power transmission means in said housing including a driving member and a plurality of driven members, a clutch in said housing operatively interposed between said driving member and each of said driven members to selectively establish and interrupt the transmission of power from said driving member to the respective driven members, a brake in said housing operatively interposed between said driving member and each of said driven members to selectively retard rotation of said driven members, hydraulic actuator means for each of the clutches and for each of the brakes, and means for selectively supplying oil under pressure from said oil containing housing to each of said actuator means selectively and independently.

7. Power transmission mechanism as defined in claim 6, wherein the means for supplying oil under pressure to the actuator means includes a constantly running pump, means for carrying the oil from said housing to said pump, a clutch selector valve, a brake selector valve, means for carrying oil under pressure from said pump to each of said selector valves, means for carrying oil from said selector valves to the clutch actuator means, to said brake actuator means, and to the housing aforesaid, said clutch selector valve having means for selectively directing oil from said pump to each clutch actuator means independently, to said clutch actuator means collectively, and from each clutch actuator means to said housing, said brake selector valve having means for selectively directing oil from said pump to each brake actuator means independently, to said brake actuator means collectively, and from each brake actuator means to said housing, and a brake control valve interposed between said brake selector valve and said pump and said housing, said control valve having means for directing oil under pressure selectively to said brake selector valve and to said housing.

8. Power transmission mechanism of the class described, comprising a power input member, a power output member, clutch means including friction discs shiftably connected with said members for movement into and out of engagement for establishing and interrupting the transmission of power between said members, a fixed member, brake means including friction discs shiftably connected to said fixed member and one of said power members for movements into and out of engagement for braking the latter power member, said clutch and brake means each including a shiftable actuator member and a common relatively stationary actuator member, said relatively stationary actuator member being disposed between said clutch and brake discs and being connected with said power output member, means for shifting each of the shiftable actuator members toward said relatively stationary actuator member to engage the clutch and brake discs between the respective shiftable actuator members and said relatively stationary actuator member, and means for shifting the respective shiftable actuator members away from the relatively stationary actuator member.

9. Power transmission mechanism of the class described, comprising a rotatable shaft, an axially aligned fixed shaft, a member rotatably mounted upon said rotatable shaft, a member fixedly mounted upon said fixed shaft, a hydraulic actuator device mounted upon each of said members and including an actuator cylinder having a piston reciprocably mounted therein, means connecting one of said actuator cylinders to the rotatable member, means rigidly connecting said actuator cylinders together, a relatively stationary member disposed between the pistons of the actuator cylinders and connected to the means connecting the actuator cylinders together, friction means between each of said pistons and said relatively stationary member and respectively connected with said fixed shaft, with said rotatable shaft, and with the means connecting the actuator cylinders together, and means for biasing said pistons away from said relatively stationary member.

10. Power transmission mechanism of the class described, comprising a rotary power input member, a rotatable power output member, a fixed member, friction means for establishing and interrupting the transmission of power from said input member to said output member, and friction means for establishing and interrupting the transmission of power from said output member to said fixed member, said friction means each including friction elements adapted to be shifted into engagement with one another, means for disengaging said friction elements, and a fluid-operated actuator device for shifting said friction elements into engagement, each actuator device having a cylinder connected to said power output member for rotation therewith, a piston shiftably mounted in said cylinder, and means for selectively directing an operating fluid into and out of each of said cylinders.

11. Power transmission mechanism as defined in claim 10, wherein one actuator cylinder is fixed on said output member and the other actuator cylinder is rotatably mounted upon said fixed member.

12. Power transmission mechanism as defined in claim 10, wherein one actuator cylinder is fixed on said output member and the other actuator cylinder is rotatably mounted upon said fixed member, and including means rigidly connecting said actuator cylinders together, said friction elements of each friction device being connected to said connecting means and to said output and fixed member, respectively.

13. Power transmission mechanism as defined in claim 10, wherein each actuator cylinder is in the form of an annular member having an axially extended cylindrical hub, and the means for directing fluid into said cylinders comprises an annular stationary adapter freely mounted on each of said cylindrical hubs, said hubs each having a longitudinally extended passage therein communicating with the cylinder and an annular passage extended about the outer periphery of the hub and communicating with said longitudinally extended passage, said adapters each having a passage therethrough for communication with a source of fluid and communicating with the annular passage in each hub.

References Cited in the file of this patent

UNITED STATES PATENTS

| | | |
|---|---|---|
| 2,386,220 | Lawler et al. | Oct. 9, 1945 |
| 2,567,042 | Wemp | Sept. 4, 1951 |
| 2,615,542 | LeTourneau | Oct. 28, 1952 |
| 2,669,330 | Banker | Feb. 16, 1954 |
| 2,669,333 | Johnson | Feb. 16, 1954 |
| 2,712,370 | Westfall | July 5, 1955 |
| 2,771,974 | Mooney | Nov. 27, 1956 |
| 2,786,368 | Cook | Mar. 26, 1957 |

FOREIGN PATENTS

| | | |
|---|---|---|
| 291,589 | Switzerland | Sept. 16, 1953 |